United States Patent
Asano et al.

(10) Patent No.: US 10,997,298 B2
(45) Date of Patent: May 4, 2021

(54) PROCESSING APPARATUS, AND SEMICONDUCTOR INTEGRATED CIRCUIT AND BOOT METHOD THEREFOR

(71) Applicant: Socionext Inc., Kanagawa (JP)

(72) Inventors: Kazuya Asano, Yokohama (JP); Yuya Ueno, Yokohama (JP); Seiji Goto, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 191 days.

(21) Appl. No.: 16/259,884

(22) Filed: Jan. 28, 2019

(65) Prior Publication Data

US 2019/0171821 A1  Jun. 6, 2019

Related U.S. Application Data

(63) Continuation of application No. PCT/JP2017/017523, filed on May 9, 2017.

(30) Foreign Application Priority Data

Aug. 30, 2016  (JP) .............................. JP2016-167892

(51) Int. Cl.
*G06F 21/57* (2013.01)
*H04L 9/08* (2006.01)
(Continued)

(52) U.S. Cl.
CPC .......... *G06F 21/575* (2013.01); *G06F 9/4401* (2013.01); *G06F 9/4405* (2013.01);
(Continued)

(58) Field of Classification Search
CPC ...... G06F 21/57; G06F 21/572; G06F 21/575; G06F 9/4416; G06F 9/4401; G06F 9/4405; G06F 21/85; H04L 9/0827
See application file for complete search history.

(56) References Cited

U.S. PATENT DOCUMENTS 6,240,074 B1 * 5/2001 Chandos ............ H04B 7/18565
370/319
7,865,733 B2 1/2011 Goto et al.
(Continued)

FOREIGN PATENT DOCUMENTS

EP  2 813 966 A2  12/2014
JP  H03-98153 A   4/1991
(Continued)

OTHER PUBLICATIONS

Communication pursuant to Article 94(3) EPC, from the European Patent Office in counterpart European Application No. 17845777.6, dated Jun. 18, 2020.
(Continued)

*Primary Examiner* — Thaddeus J Plecha
(74) *Attorney, Agent, or Firm* — Arent Fox LLP

(57) ABSTRACT

A semiconductor integrated circuit generates second boot code by encrypting first boot code, and transmits, based on route information indicating a delivery route of the second boot code, encrypted data including the second boot code to a first destination via a network. A different semiconductor integrated circuit is the first destination, and receives the encrypted data via the network and generates third boot code by decrypting the second boot code.

26 Claims, 14 Drawing Sheets

(51) Int. Cl.
　　　*G06F 9/4401*　　(2018.01)
　　　*G06F 15/177*　　(2006.01)
　　　*G06F 21/85*　　(2013.01)
(52) U.S. Cl.
　　　CPC .......... *G06F 9/4416* (2013.01); *G06F 15/177* (2013.01); *G06F 21/57* (2013.01); *G06F 21/572* (2013.01); *G06F 21/85* (2013.01); *H04L 9/0822* (2013.01); *H04L 9/0827* (2013.01); *H04L 9/0897* (2013.01)

(56) References Cited

U.S. PATENT DOCUMENTS

| | | | |
|---|---|---|---|
| 8,468,364 | B2 | 6/2013 | Goto |
| 2007/0186092 | A1* | 8/2007 | Uemura ................ G06F 9/4405 713/2 |
| 2007/0260912 | A1* | 11/2007 | Hatasaki ............ G06F 11/2028 714/4.4 |
| 2008/0229092 | A1* | 9/2008 | Dale .................... G06F 15/177 713/2 |
| 2010/0064125 | A1 | 3/2010 | Liu et al. |
| 2012/0331303 | A1* | 12/2012 | Andersson ............ G06F 21/51 713/189 |
| 2014/0164753 | A1* | 6/2014 | Lee ...................... G06F 21/575 713/2 |
| 2015/0039874 | A1* | 2/2015 | Schlanger ............. G06F 9/4401 713/2 |
| 2015/0160946 | A1* | 6/2015 | Peng ........................ G06F 8/30 713/2 |
| 2015/0188517 | A1* | 7/2015 | Williams ............... H03K 3/012 327/199 |
| 2016/0180114 | A1 | 6/2016 | Sastry et al. |
| 2017/0237658 | A1* | 8/2017 | Roberts ................ H04L 45/745 370/392 |

FOREIGN PATENT DOCUMENTS

| | | |
|---|---|---|
| JP | H04-364563 A | 12/1992 |
| JP | H05-242057 A | 9/1993 |
| JP | 2006-18528 A | 1/2006 |
| JP | 2007-226481 A | 9/2007 |
| JP | 2013-16012 A | 1/2013 |

OTHER PUBLICATIONS

Ikeno, N. et al., "Modern Cryptography Theory", 1st edition, The Institute of Electronics, Information and Communication Engineers, Sep. 1, 1986, 6 Pages total, (with English Translation).

International Search Report, issued by International Searching Authority in corresponding International Application No. PCT/JP2017/017523, dated Jul. 4, 2017 (PCT/ISA/210), (with English Translation).

Written Opinion, issued by international Searching Authority in corresponding International Application No. PCT/JP2017/017523 dated Jul. 4, 2017 (PCT/ISA/237), (with English Translation).

Extended Search Report from the European Patent Office in counterpart European Application No. 17845777.6, dated Aug. 12, 2019.

* cited by examiner

| ITEM NO. | DATA |
|---|---|
| 1 | TOTAL NUMBER OF SLAVES |
| 2 | INFORMATION OF SLAVE 32 |
| 3 | INFORMATION OF SLAVE 33 |
| 4 | INFORMATION OF SLAVE 34 |
| 5 | INFORMATION OF SLAVE 35 |
| 6 | INFORMATION OF SLAVE 36 |
| 7 | INFORMATION OF SLAVE 37 |
| 8 | INFORMATION OF SLAVE 38 |
| 9 | INFORMATION OF SLAVE 39 |

| ITEM NO. | DATA |
|---|---|
| 1 | SLAVE MAC ADDRESS |
| 2 | SOURCE MAC ADDRESS |
| 3 | RECEPTION DATA STORAGE BEGINNING ADDRESS |
| 4 | DATA SIZE |
| 5 | TRANSMISSION DATA STORAGE BEGINNING ADDRESS |

FIG. 7

| ITEM NO. | DATA |
|---|---|
| 1 | TOTAL NUMBER OF SLAVES |
| 2 | INFORMATION OF SLAVE 32 |
| 3 | INFORMATION OF SLAVE 36 |
| 4 | INFORMATION OF SLAVE 37 |
| 5 | INFORMATION OF SLAVE 38 |
| 6 | INFORMATION OF SLAVE 39 |
| 7 | INFORMATION OF SLAVE 33 |
| 8 | INFORMATION OF SLAVE 34 |
| 9 | INFORMATION OF SLAVE 35 |

FIG. 11

| ITEM NO. | DATA NAME | SLAVE MAC ADDRESS | SOURCE MAC ADDRESS | RECEPTION DATA STORAGE BEGINNING ADDRESS | DATA SIZE | TRANSMISSION DATA STORAGE BEGINNING ADDRESS |
|---|---|---|---|---|---|---|
| 2 | INFORMATION OF SLAVE 32 | MACS0 | MACM | Add1 | S1 | Add0 |
| 3 | INFORMATION OF SLAVE 36 | MACS4 | MACS0 | Add1 | S1 | Add1 |
| 4 | INFORMATION OF SLAVE 37 | MACS5 | MACS4 | Add1 | S1 | Add1 |
| 5 | INFORMATION OF SLAVE 38 | MACS6 | MACS5 | Add1 | S1 | Add1 |
| 6 | INFORMATION OF SLAVE 39 | MACS7 | MACS6 | Add1 | S1 | Add1 |
| 7 | INFORMATION OF SLAVE 33 | MACS1 | MACS0 | Add1 | S1 | Add1 |
| 8 | INFORMATION OF SLAVE 34 | MACS2 | MACS1 | Add1 | S1 | Add1 |
| 9 | INFORMATION OF SLAVE 35 | MACS3 | MACS0 | Add1 | S1 | Add1 |

FIG. 12

PROCESSING APPARATUS, AND SEMICONDUCTOR INTEGRATED CIRCUIT AND BOOT METHOD THEREFOR

CROSS-REFERENCE TO RELATED APPLICATION

This application is a continuation application of International Application PCT/JP2017/017523 filed on May 9, 2017 and designated the U.S., which is based upon and claims the benefit of priority of the prior Japanese Patent Application No. 2016-167892, filed on Aug. 30, 2016, the entire contents of which are incorporated herein by reference.

FIELD

The embodiments discussed herein are related to a processing apparatus, a semiconductor integrated circuit, and a method for starting up the semiconductor integrated circuit.

BACKGROUND

Along with systems becoming increasingly complicated and growing in size, some proposed systems include a plurality of System-on-Chips (SoCs).

To consolidate the security of information equipment, there are conventionally proposed techniques where a memory unit stores therein encrypted data and instruction code and a processor decrypts the encrypted instruction code and carries out instructions.

See, for example, Japanese Laid-open Patent Publication No. 2006-18528 and Japanese Laid-open Patent Publication No. 2007-226481.

To ensure the reliability of a system including a plurality of SoCs, it is considered effective, for example, to provide each of the SoCs with a non-volatile memory device for storing encrypted boot code and a controller on a different chip connected thereto for decrypting the boot code. This, however, creates the problem of increased number of elements (e.g. chips) included in the system, which leads to increasing costs.

SUMMARY

According to one aspect, there is provided a processing apparatus including a first semiconductor integrated circuit configured to generate a second boot code by encrypting a first boot code and transmit, based on first route information indicating a delivery route of the second boot code, first data including the second boot code to a first destination via a first network; and a second semiconductor integrated circuit configured to serve as the first destination and receive the first data via the first network, and generate the first boot code by decrypting the second boot code.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an exemplary file format of route information;

FIG. 11 illustrates exemplary route information;

FIG. 12 is exemplary slave information;

DESCRIPTION OF EMBODIMENTS

Figure 1:
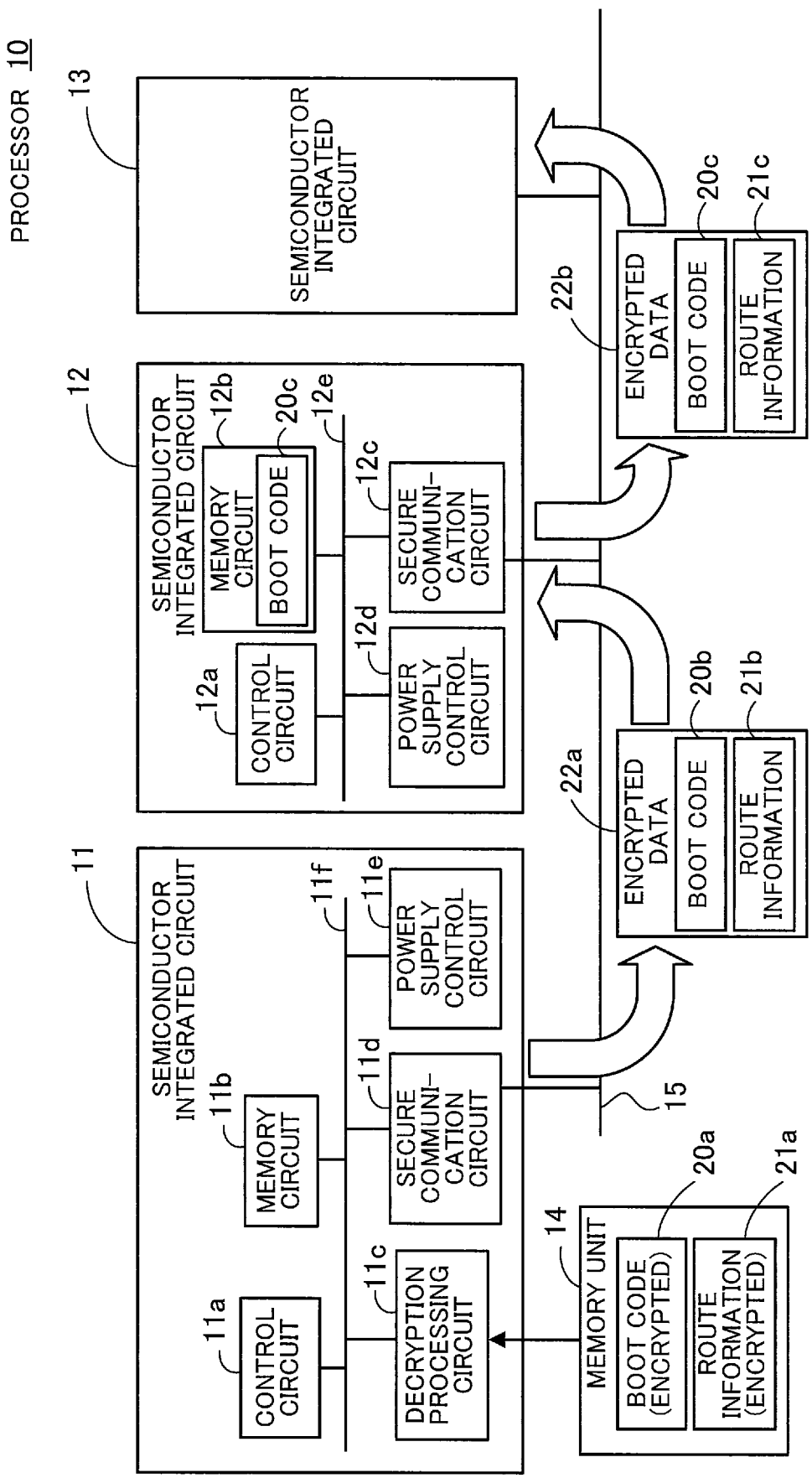
FIG. 1 illustrates an exemplary processor according to a first embodiment.

Several embodiments will be described below with reference to the accompanying drawings, wherein like reference numerals refer to like elements throughout.

First Embodiment

FIG. 1 illustrates an exemplary processor according to a first embodiment.

A processor 10 includes semiconductor integrated circuits 11, 12, and 13, a memory unit 14, and a network 15.

Each of the semiconductor integrated circuits 11 to 13 is, for example, a single SoC. The processor 10 of FIG. 1 has three semiconductor integrated circuits 11 to 13; however, the processor 10 only needs to include two or more semiconductor integrated circuits, and the applicable scope of the technology according to the first embodiment is not limited to this example. Note that the processor 10 may be implemented with a single SoC including two or more semiconductor integrated circuits thereon.

The semiconductor integrated circuit 11 includes a control circuit 11a, a memory circuit 11b, a decryption processing circuit 11c, a secure communication circuit 11d, and a power supply control circuit 11e, which are all connected to a system bus 11f.

The control circuit 11a is, for example, a microcontroller or central processing unit (CPU), and controls each element of the semiconductor integrated circuit 11 via the system bus 11f.

The memory circuit 11b may be volatile semiconductor memory such as random access memory (RAM), or a non-volatile storage device such as flash memory. The memory circuit 11b stores therein programs to be executed by the control circuit 11a (for example, boot code of the control circuit 11a) and various data.

The decryption processing circuit 11c decrypts encrypted boot code 20a and route information 21a which indicates a delivery route of the boot code 20a, read from the memory unit 14. Note that an example of the decryption and encryption processes is described later.

The secure communication circuit 11d has a function of encrypting data and transmitting it to a destination (for example, the semiconductor integrated circuit 12) via the network 15. The secure communication circuit 11d encrypts again the boot code 20a and the route information 21a decrypted by the decryption processing circuit 11c, to thereby generate boot code 20b and route information 21b and then transmits encrypted data 22a including the generated boot code 20b and route information 21b, as illustrated in FIG. 1. Further, upon receiving, from the destination, an acknowledgement signal indicating receipt completion, the secure communication circuit 11d notifies the control circuit 11a of the completion of data receipt at the destination. Then, upon receiving, from the control circuit 11a, a signal instructing start-up of individual control circuits of the semiconductor integrated circuits 12 and 13 (e.g. a control circuit 12a in the case of the semiconductor integrated circuit 12), the secure communication circuit 11d transmits a boot instruction signal to the semiconductor integrated circuits 12 and 13.

The power supply control circuit 11e provides, via the system bus 11f, power supply and control over turning on and off individual elements of the semiconductor integrated circuit 11, to thereby decide whether to start up each of the elements.

The semiconductor integrated circuit 12 includes the control circuit 12a, a memory circuit 12b, a secure communication circuit 12c, and a power supply control circuit 12d, which are all connected to a system bus 12e.

The control circuit 12a is, for example, a microcontroller or CPU, and controls each element of the semiconductor integrated circuit 12 via the system bus 12e, as with the control circuit 11a of the semiconductor integrated circuit 11.

The memory circuit 12b may be volatile semiconductor memory such as RAM, or a non-volatile storage device such as flash memory. The memory circuit 12b stores therein boot code 20c to be executed by the control circuit 12a and various types of data.

The secure communication circuit 12c receives the encrypted data 22a via the network 15 and decrypts the encrypted boot code 20b and route information 21b. The secure communication circuit 12c encrypts again the decrypted boot code 20b and route information 21b, to thereby generate boot code 20c and route information 21c, as illustrated in FIG. 1. Subsequently, the secure communication circuit 12c transmits encrypted data 22b including the boot code 20c and the route information 21c to a destination (for example, the semiconductor integrated circuit 13) via the network 15. Further, the secure communication circuit 12c transmits an acknowledgement signal indicating the completion of receiving the encrypted data 22a, to the semiconductor integrated circuit 11 via the network 15. In addition, upon receiving a boot instruction signal transmitted by the semiconductor integrated circuit 11, the secure communication circuit 12c notifies the power supply control circuit 12d of the receipt of the boot instruction signal.

The power supply control circuit 12d provides, via the system bus 12e, power supply and control over turning on and off individual elements of the semiconductor integrated circuit 12, to thereby decide whether to start up each of the elements. For example, at power-on of the processor 10, the power supply control circuit 12d starts up the secure communication circuit 12c. Then, upon receiving notice of receipt of a boot instruction signal from the secure communication circuit 12c, the power supply control circuit 12d starts up the control circuit 12a.

The semiconductor integrated circuit 13 also includes similar elements to those of the semiconductor integrated circuit 12 although FIG. 1 omits representation of such elements.

The memory unit 14 is, for example, a non-volatile storage device such as flash memory, and stores therein the encrypted boot code 20a used in boot processes of the semiconductor integrated circuits 12 and 13 and the encrypted route information 21a indicating a delivery route of the boot code 20a. Note that the memory unit 14 may be provided in the semiconductor integrated circuit 11. The boot code 20a may be common boot code shared between the semiconductor integrated circuits 12 and 13, or may include different boot code modules each dedicated to the individual semiconductor integrated circuits 12 and 13. The route information 21a may be unencrypted.

The network 15 is used for secure boot code delivery and monitoring the internal state of the processor 10, and not connected to the outside of the processor 10. For example, Ethernet (registered trademark) may be used as the network 15.

In the above-described processor 10, the semiconductor integrated circuit 11 serves as a master while the semiconductor integrated circuits 12 and 13 serve as slaves. When the processor 10 is powered on, the power supply control circuits 11e and 12d start up (N.B. a power supply control circuit (not illustrated) of the semiconductor integrated circuit 13 also starts up).

Then, the power supply control circuit 11e first starts up the control circuit 11a. The power supply control circuit 11e (or the control circuit 11a) starts up the decryption processing circuit 11c and the secure communication circuit 11d. Herewith, under the control of the control circuit 11a, the decryption processing circuit 11c reads the encrypted boot code 20a and route information 21a from the memory unit 14 and decrypts them, and then supplies the decrypted data to the system bus 11f. Next, the secure communication circuit 11d encrypts again the decrypted data obtained from the boot code 20a and the route information 21a by the decryption processing circuit 11c, to thereby generate the boot code 20b and the route information 21b. Note that the route information 21b may be unencrypted.

In the case where the boot code 20a includes different boot code modules each dedicated to the individual semiconductor integrated circuits 12 and 13, the boot code 20b may include different boot code modules each dedicated to the individual semiconductor integrated circuits 12 and 13, or may include only the boot code module dedicated to the semiconductor integrated circuit 13 without including the boot code module for the semiconductor integrated circuit 12. On the other hand, in the case where the boot code 20a includes common boot code shared between the semiconductor integrated circuits 12 and 13, the boot code 20b includes the common boot code.

Then, the secure communication circuit 11d identifies a destination (the semiconductor integrated circuit 12 in the example of FIG. 1) based on the data obtained by decrypting the route information 21a, and transmits the encrypted data 22a including the boot code 20b and the route information 21b to the identified destination via the network 15. Note that, at this time, the control circuit 11a may determine whether the decrypted boot code is appropriate.

On the other hand, in the semiconductor integrated circuit 12, after the power supply control circuit 12d starts up, the power supply control circuit 12d starts up the secure communication circuit 12c without starting up the control circuit 12a. Upon receiving the encrypted data 22a, the secure communication circuit 12c decrypts the encrypted boot code 20b and route information 21b. Then, the secure communication circuit 12c stores, in the memory circuit 12b, the boot code 20c obtained from the decryption.

Further, the secure communication circuit 12c transmits, to the semiconductor integrated circuit 11, an acknowledgement signal indicating the receipt completion of the encrypted data 22a. In addition, if determining, based on the data obtained by decrypting the route information 21b, that a delivery route ahead of the semiconductor integrated circuit 12 is designated, the secure communication circuit 12c encrypts again data obtained by decrypting the boot code 20b and the route information 21b to thereby generate the encrypted data 22b including the encrypted boot code 20c and route information 21c, and then transmits the encrypted data 22b to a destination. In the example of FIG. 1, the semiconductor integrated circuit 13 is the transmission destination of the semiconductor integrated circuit 12. Note that the route information 21c may be unencrypted.

In the case where the boot code 20a includes different boot code modules each dedicated to the individual semiconductor integrated circuits 12 and 13, the boot code 20c needs to include only the boot code module dedicated to the semiconductor integrated circuit 13 and need not include the boot code module dedicated to the semiconductor integrated circuit 12. On the other hand, in the case where the boot code 20a includes common boot code shared between the semiconductor integrated circuits 12 and 13, the boot code 20c includes the common boot code.

Upon receiving the encrypted data 22b, the semiconductor integrated circuit 13 undergoes a similar process to that described above for the semiconductor integrated circuit 12.

Upon receiving an acknowledgement signal indicating the receipt completion, transmitted from each of the semiconductor integrated circuits 12 and 13, the secure communication circuit 11d of the semiconductor integrated circuit 11 notifies the control circuit 11a of the receipt of the acknowledgement signals. When determining, based on the notice from the secure communication circuit 11d, that the receipt of the encrypted data 22a and 22b has been completed at the semiconductor integrated circuits 12 and 13, respectively, the control circuit 11a sends a notice that prompts the secure communication circuit 11d to instruct the start-up of the individual control circuits of the semiconductor integrated circuits 12 and 13. Upon receiving the notice, the secure communication circuit 11d transmits a boot instruction signal to the semiconductor integrated circuits 12 and 13.

Upon receiving the boot instruction signal, the secure communication circuit 12c of the semiconductor integrated circuit 12 notifies the power supply control circuit 12d of the receipt of the boot instruction signal. Upon receiving the notice, the power supply control circuit 12d starts up the control circuit 12a, which subsequently executes a boot process based on the boot code 20c stored in the memory circuit 12b.

A similar boot process to that described above for the semiconductor integrated circuit 12 takes place in the semiconductor integrated circuit 13 in response to receiving the boot instruction signal.

As has been described above, the semiconductor integrated circuit 11 transmits the encrypted data 22a including the encrypted boot code 20b and the encrypted route information 21b that indicates a delivery route of the boot code 20b. Then, upon receiving an acknowledgement signal indicating the completion of receiving the encrypted data 22a, the semiconductor integrated circuit 11 transmits a boot instruction signal. On the other hand, the semiconductor integrated circuit 12 receives the encrypted data 22a from the semiconductor integrated circuit 11 and transmits the acknowledgement signal to the semiconductor integrated circuit 12 via the network 15. In addition, the semiconductor integrated circuit 12 generates the boot code 20c by decrypting the boot code 20b included in the encrypted data 22a, and then executes a boot process based on the boot code 20c upon receiving the boot instruction signal.

According to the processor 10 described above, because the semiconductor integrated circuit 11 supplies the encrypted boot code 20b to the semiconductor integrated circuit 12, there is no need to connect a memory unit for storing boot code to the semiconductor integrated circuit 12. That is, the semiconductor integrated circuit 12 need not manage boot code. In addition, because decryption of the encrypted boot code 20b takes place within the semiconductor integrated circuit 12, there is no need to connect a controller on a different chip thereto. Thus, it is possible to enhance the reliability of the processor 10 with a simple configuration, which in turn is likely to reduce the cost.

In addition, the semiconductor integrated circuit 12 serving as a slave encrypts again decrypted boot code and route information and transmits the encrypted data to a destination (the semiconductor integrated circuit 13 in the example of FIG. 1) based on the route information, to thereby lighten the workload of the semiconductor integrated circuit 11 serving as a master.

Note that the semiconductor integrated circuits 11 and 12 may encrypt data other than boot code and then transmit it.

Second Embodiment

Figure 2:
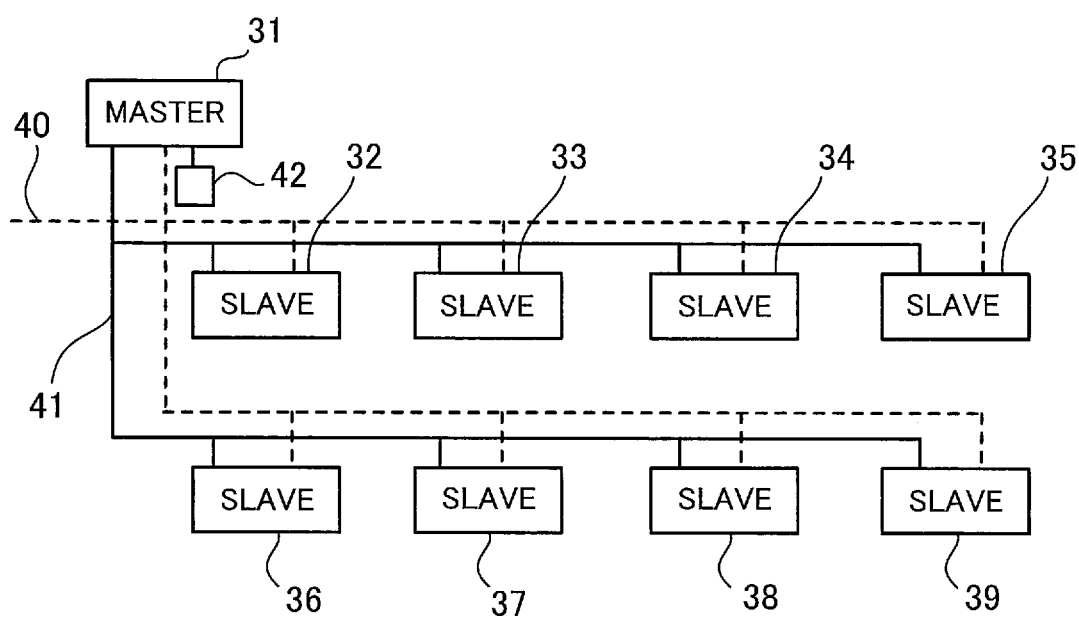
FIG. 2 illustrates an exemplary processor according to a second embodiment.

FIG. 2 illustrates an exemplary processor according to a second embodiment.

A processor 30 of the second embodiment includes a master 31 and slaves 32, 33, 34, 35, 36, 37, 38, and 39, which are connected to networks 40 and 41. In addition, a non-volatile memory device 42 is connected to the master 31.

Each of the master 31 and the slaves 32 to 39 is, for example, a single SoC.

The network 40 is connected to the outside of the processor 30. On the other hand, the network 41 is provided independently of the network 40, and not connected to the outside of the processor 30. For example, Ethernet (registered trademark) may be used as the network 41.

The non-volatile memory device 42 is, for example, flash memory and stores therein boot code to be executed to start up the slaves 32 to 39. Note that the non-volatile memory device 42 may be provided in the master 31.

Next described are examples of hardware of the master 31 and the slaves 32 to 39. Note that the following description is directed to elements engaged in a secure communication process using the network 41 while omitting those engaged in a communication process using the network 40.

Figure 3:
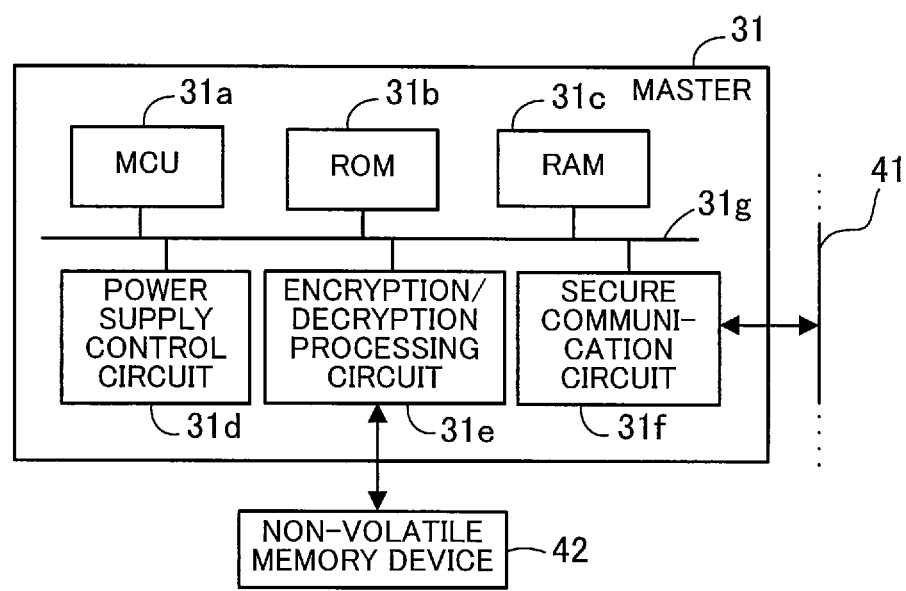
FIG. 3 illustrates an exemplary master.

FIG. 3 illustrates an exemplary master.

The master 31 has functions similar to those of the semiconductor integrated circuit 11 of the processor 10 according to the first embodiment. The master 31 includes a microcontroller unit (MCU) 31a, a read only memory (ROM) 31b, a RAM 31c, a power supply control circuit 31d, an encryption/decryption processing circuit 31e, and a secure communication circuit 31f, which are all connected to a system bus 31g.

The MCU 31a controls, based on a program stored in the ROM 31b, each element of the master 31 via the system bus 31g. Note that a processor like a CPU may be used in place of the MCU 31a.

The ROM 31b is a non-volatile storage device such as flash memory and stores therein programs to be executed by the MCU 31a (e.g. boot code of the MCU 31a) and various types of data. The RAM 31c temporarily stores at least part of programs to be executed by the MCU 31a. The RAM 31c also stores therein various types of data to be used by the MCU 31a for its processing.

The power supply control circuit 31d provides, via the system bus 31g, power supply and control over turning on and off individual elements of the master 31, to thereby decide whether to start up each of the elements.

The encryption/decryption processing circuit 31e encrypts, for example, boot code of MCUs of the slaves 32 to 39 and route information indicating a delivery route of the boot code, and preliminarily stores these in the non-volatile memory device 42. Further, the encryption/decryption processing circuit 31e decrypts encrypted boot code and route information read from the non-volatile memory device 42.

The secure communication circuit 31f encrypts again the boot code and route information and transmits encrypted data including the encrypted boot code and route information to a destination (one of the slaves 32 to 39). Further, upon receiving, from the destination, an acknowledgement signal indicating the receipt of the encrypted data, the secure communication circuit 31f notifies the MCU 31a of the successful data receipt at the destination. Then, upon receiving, from the MCU 31a, a signal which indicates instructing start-up of the MCUs of all the slaves 32 to 39, the secure communication circuit 31f transmits a boot instruction signal to the slaves 32 to 39.

Note that the secure communication circuit 31f may encrypt and then transmit data other than the encrypted boot code and route information.

Figure 4:
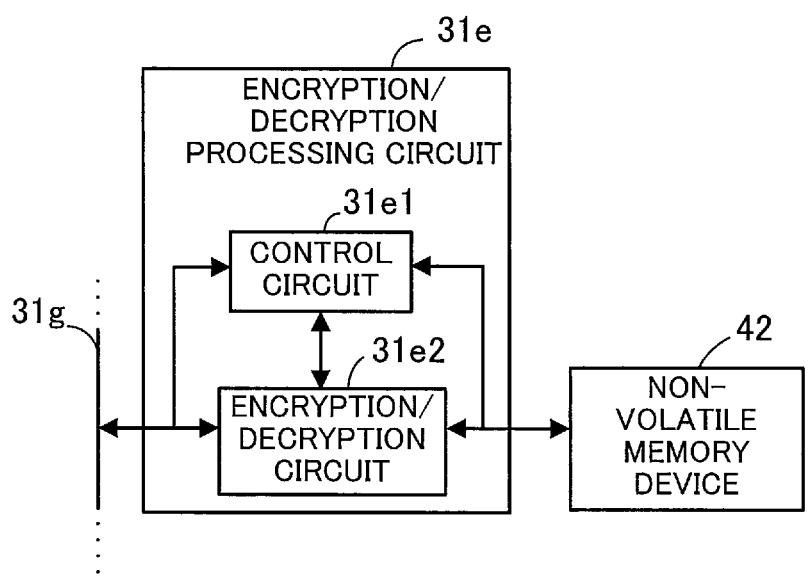
FIG. 4 illustrates an exemplary encryption/decryption processing circuit.

FIG. 4 illustrates an exemplary encryption/decryption processing circuit.

The encryption/decryption processing circuit 31e includes a control circuit 31e1 and an encryption/decryption circuit 31e2.

The control circuit 31e1 controls an encryption/decryption process using the encryption/decryption circuit 31e2.

The encryption/decryption circuit 31e2 performs an encryption/decryption process on data exchanged with the non-volatile memory device 42. The following describes an example of the encryption/decryption process using a hardware key and a common encryption key.

For example, at initial startup of the master 31, the encryption/decryption circuit 31e2 encrypts, using a common encryption key, boot code of the slaves 32 to 39 and route information indicating a delivery route of the boot code, supplied from the ROM 31b or the RAM 31c via the system bus 31g. Further, the encryption/decryption circuit 31e2 encrypts the common encryption key using the hardware key.

Based on an address designated by the MCU 31a (a write address) via the system bus 31g, the control circuit 31e1 stores, in the non-volatile memory device 42, the boot code and route information encrypted with the common encryption key and the common encryption key encrypted with the hardware key.

At each start-up after the initial time, the control circuit 31e1 reads, based on an address designated by the MCU 31a (a read address), the encrypted common encryption key, boot code, and route information from the non-volatile memory device 42. Then, under the control of the control circuit 31e1, the encryption/decryption circuit 31e2 decrypts the common encryption key with the hardware key and decrypts the boot code and the route information with the decrypted common encryption key.

Note that, instead of providing the encryption/decryption circuit 31e2, the above-described boot code, route information, and common encryption key may be encrypted in advance by a system different from the processor 10 and then stored in the non-volatile memory device 42.

Figure 5:
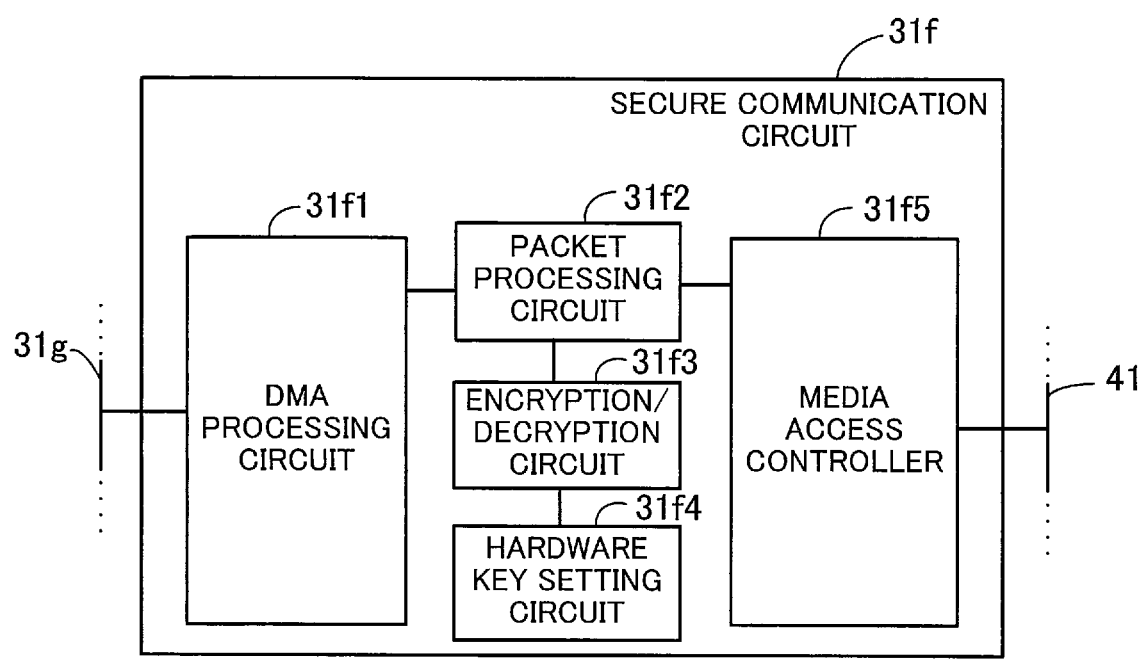
FIG. 5 illustrates an exemplary secure communication circuit.

FIG. 5 illustrates an exemplary secure communication circuit.

The secure communication circuit 31f includes a direct memory access (DMA) processing circuit 31f1, a packet processing circuit 31f2, an encryption/decryption circuit 31f3, a hardware key setting circuit 31f4, and a media access controller 31f5.

Based on a command supplied from the MCU 31a or the packet processing circuit 31f2, the DMA processing circuit 31f1 transmits data to the RAM 31c of the master 31 via the system bus 31g, or, to the non-volatile memory device 42 via the system bus 31g and the encryption/decryption processing circuit 31e. Also, based on a command supplied from the MCU 31a or the packet processing circuit 31f2, the DMA processing circuit 31f1 receives data from the RAM 31c of the master 31 via the system bus 31g, or, from the non-volatile memory device 42 via the system bus 31g and the encryption/decryption processing circuit 31e.

Upon receiving, from the DMA processing circuit 31f1, information stored in the RAM 31c (e.g. boot code and route information), the packet processing circuit 31f2 generates a packet based on the information and then transmits the packet to the encryption/decryption circuit 31f3. Further, upon receiving an encrypted packet from the encryption/decryption circuit 31f3, the packet processing circuit 31f2 supplies the encrypted packet to the media access controller 31f5. Upon receiving an encrypted packet from the media access controller 31f5, the packet processing circuit 31f2 transmits the encrypted packet to the encryption/decryption circuit 31f3. Further, upon receiving a decrypted packet from the encryption/decryption circuit 31f3, the packet processing circuit 31f2 supplies the decrypted packet to the DMA processing circuit 31f1.

The encryption/decryption circuit 31f3 performs, using the hardware key, encryption and decryption of a packet and hash calculation.

The hardware key is set in the hardware key setting circuit 31f4. One Time Programmable-ROM (OTP-ROM), such as an electric fuse (E-Fuse), may be used as the hardware key setting circuit 31f4.

The media access controller 31f5 exchanges, using media access control (MAC) addresses, encrypted packets with the slaves 32 to 39 via the network 41.

Figure 6:
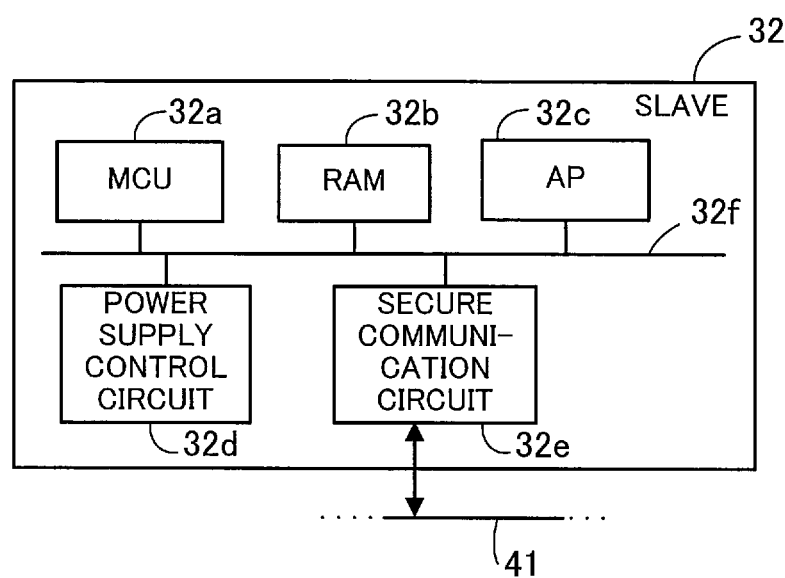
FIG. 6 illustrates an exemplary slave.

FIG. 6 illustrates an exemplary slave.

Note that FIG. 6 depicts an example of the slave 32 amongst the slaves 32 to 39; however, each of the remaining slaves 33 to 39 may be implemented by a similar circuit. The slave 32 has similar functions to those of the semiconductor integrated circuit 12 provided in the processor 10 in FIG. 1 according to the first embodiment.

The slave 32 includes an MCU 32a, a RAM 32b, an application processor (AP) 32c, a power supply control circuit 32d, and a secure communication circuit 32e, which are all connected to a system bus 32f.

The MCU 32a executes a program stored in the RAM 32b, to thereby control each element of the slave 32 via the system bus 32f. Note that a processor such as a CPU may be used in place of the MCU 32a.

The RAM 32b stores therein, for example, boot code of the MCU 32a and boot code of the application processor 32c, received by the secure communication circuit 32e.

The application processor 32c is a processor for performing processes of various applications, different from processes handled by the MCU 32a. The application processor 32c starts up, for example, based on boot code stored in the RAM 32b.

The power supply control circuit 32d provides, via the system bus 32f, power supply and control over turning on and off individual elements of the slave 32, to thereby decide whether to start up each of the elements.

The secure communication circuit 32e receives encrypted data via the network 41 and decrypts encrypted boot code and route information. In addition, the secure communication circuit 32e encrypts again the decrypted boot code and route information and then transmits, via the network 41, encrypted data including the encrypted boot code and route information to a destination designated in the route information. Further, the secure communication circuit 32e transmits an acknowledgement signal indicating the receipt of the encrypted data to the master 31 via the network 41. Upon receiving a boot instruction signal transmitted by the master 31, the secure communication circuit 32e notifies, via the system bus 32f, the power supply control circuit 32d of the receipt of the boot instruction signal.

The secure communication circuit 32e may be built with a similar hardware configuration as the secure communication circuit 31f in FIG. 5.

Note that the slaves 32 to 39 may be provided with elements equivalent to the ROM 31b and the encryption/decryption processing circuit 31e of the master 31, to thereby cause them serve as masters while allowing the master 31 to serve as a slave.

Next described is an example of route information stored in the non-volatile memory device 42.

FIG. 7 illustrates an exemplary file format of route information.

In the route information file format, the top item (Item No. 1) is associated with data representing the total number of slaves. The second and subsequent items (Item Nos. 2 to 9) are associated with data representing slave information of the slaves 32 to 39, respectively. The information of each of the slaves 32 to 39 includes, for example, data of five items: slave MAC address; source MAC address; reception data storage beginning address; data size; and transmission data storage beginning address.

The slave MAC address is the MAC address of the corresponding one of the slaves 32 to 39. For example, the slave MAC address included in the slave information of the slave 32 is the MAC address of the slave 32.

The source MAC address is the MAC address of a route information delivery source (the master 31 or one of the slaves 32 to 39). For example, the source MAC address included in the slave information of the slave 32 is the MAC address of the master 31.

The reception data storage beginning address is the beginning address of a memory area for storing data received by the corresponding one of the slaves 32 to 39. For example, the reception data storage beginning address included in the slave information of the slave 32 is the beginning address of a memory area in the RAM 32b, where received boot code is stored.

The data size indicates the data size of the boot code stored in the RAM 32b.

The transmission data storage beginning address is associated with a delivery source of the boot code (the master 31 or one of the slaves 32 to 39), and indicates the beginning address of a memory area where the boot code is stored within the delivery source. For example, the transmission data storage beginning address included in the slave information of the slave 32 indicates the beginning address of a memory area, within the non-volatile memory device 42, where the boot code is stored.

Figure 8:
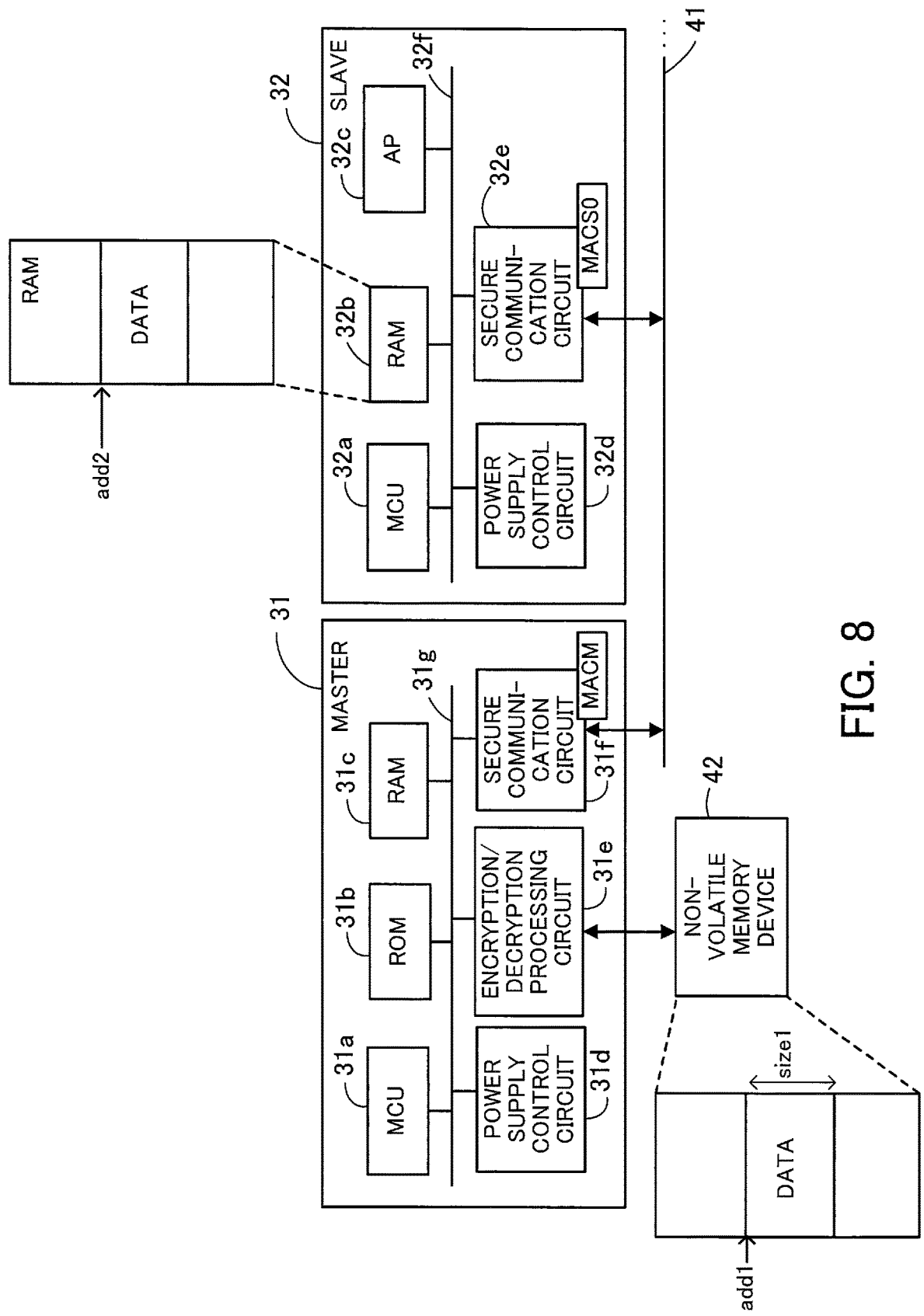
FIG. 8 illustrates an example of data included in slave information.

FIG. 8 illustrates an example of data included in slave information.

The example of FIG. 8 depicts data included in the slave information of the slave 32. MACS0, which is a slave MAC address, is set in the secure communication circuit 32e of the slave 32, and MACM, which is a source MAC address, is set in the secure communication circuit 31f of the master 31, for example.

A reception data storage beginning address add2 indicates the beginning address of a memory area, within the RAM 32b, where data (boot code) is stored. A transmission data storage beginning address add1 indicates the beginning address of a memory area, within the non-volatile memory device 42, where data (encrypted boot code) is stored. A data size size1 indicates the size of the data stored in the non-volatile memory device 42.

Next described is an example of an operation carried out by the processor 30 according to the second embodiment.

Figure 9:
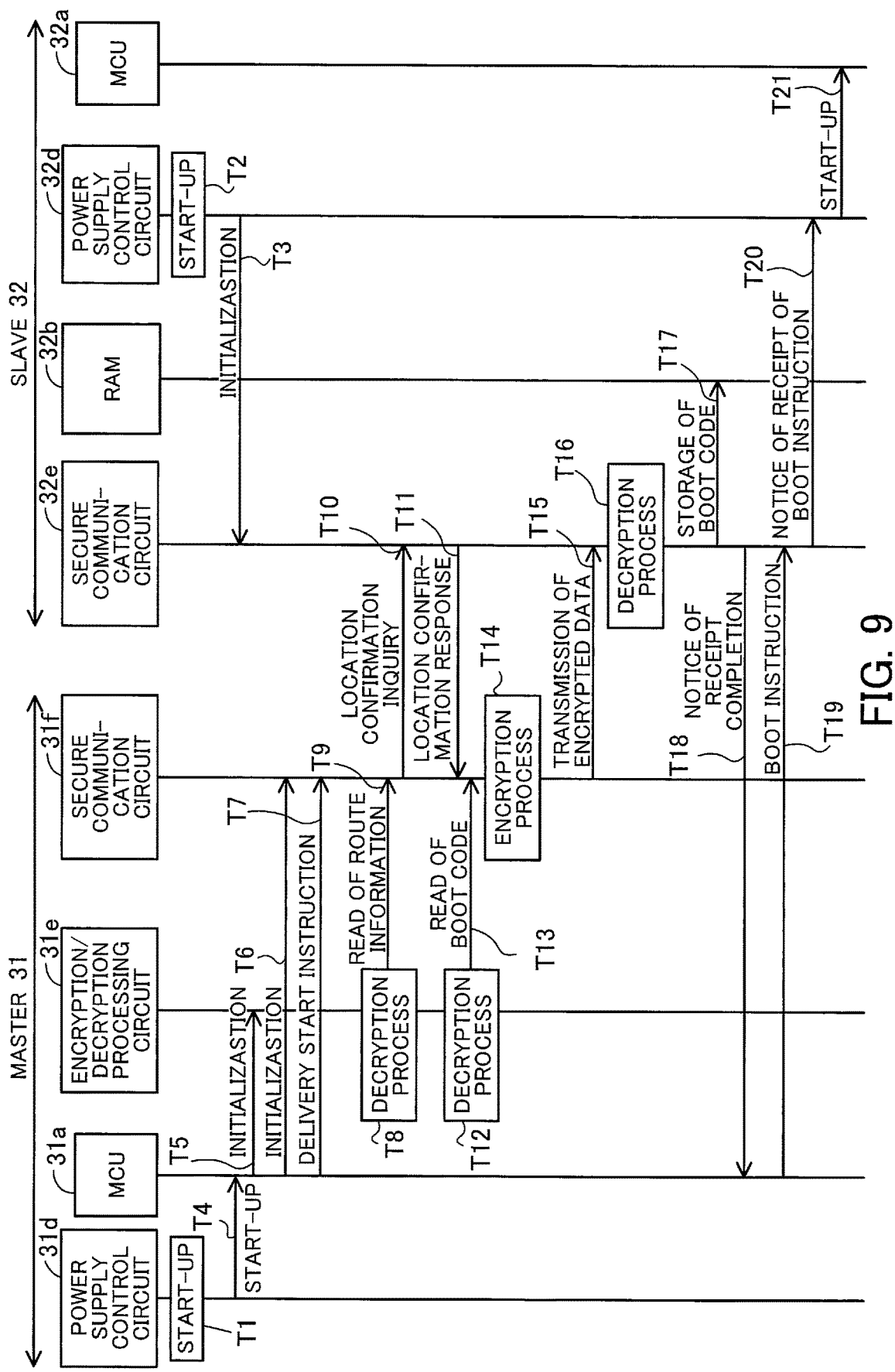
FIG. 9 is a sequence diagram illustrating an exemplary operation flow performed by the processor of the second embodiment.

FIG. 9 is a sequence diagram illustrating an exemplary operation flow performed by a processor of the second embodiment. The operation flow depicted in FIG. 9 takes place to start up the MCU 32a of the slave 32 based on boot code delivered from the master 31.

When the processor 30 is powered on, the power supply control circuit 31d of the master 31 starts up (T1), and the power supply control circuit 32d of the slave 32 starts up (T2). The power supply control circuit 32d of the slave 32 initializes the secure communication circuit 32e (for example, sets up registers) (T3) and then starts up the secure communication circuit 32e. A similar operation takes place in the remaining slaves 33 to 39 although FIG. 9 omits the representation.

The power supply control circuit 31d of the master 31 starts up the MCU 31a (T4), and the MCU 31a initializes the encryption/decryption processing circuit 31e and the secure communication circuit 31f (T5, T6) and then starts up them. Alternatively, the power supply control circuit 31d may initialize the encryption/decryption processing circuit 31e and the secure communication circuit 31f. The MCU 31a issues a delivery start instruction to the secure communication circuit 31f (T7).

The encryption/decryption processing circuit 31e reads encrypted route information, for example, from an address in the non-volatile memory device 42, designated in the initialization implemented by the MCU 31a, and decrypts the encrypted route information (T8).

The secure communication circuit 31f reads the decrypted route information from the encryption/decryption processing circuit 31e (T9), and transmits a packet to the slave 32 based on the route information, to thereby make a location confirmation inquiry (T10).

Upon receiving the location confirmation inquiry, the secure communication circuit 32e of the slave 32 transmits a response packet to the master 31, to thereby provide a response to the location confirmation inquiry (T11).

The encryption/decryption processing circuit 31e of the master 31 reads encrypted boot code, for example, from an address in the non-volatile memory device 42, designated in the initialization implemented by the MCU 31*a*, and decrypts the encrypted boot code (T12).

The secure communication circuit 31*f* reads the decrypted boot code from the encryption/decryption processing circuit 31*e* (T13) and performs an encryption process to thereby encrypt the boot code and route information (T14), and then transmits the encrypted data to the slave 32 (T15).

The secure communication circuit 32*e* of the slave 32 receives the encrypted data and performs a decryption process to obtain the boot code and root information (T16). Then, the secure communication circuit 32*e* stores the route information in a storage unit (not illustrated), e.g. a register, provided in the secure communication circuit 32*e*, and also stores the boot code in the RAM 32*b* (T17). Then, the secure communication circuit 32*e* transmits an acknowledgement signal to the master 31 to thereby notify the master 31 of the completion of data receipt (T18).

Upon receiving notice of the receipt of the encrypted data from all the slaves 32 to 39 via the secure communication circuit 31*f*, the MCU 31*a* of the master 31 causes the secure communication circuit 31*f* to transmit a boot instruction signal for instructing start-up of the individual MCUs of all the slaves 32 to 39 (T19).

Upon receiving the boot instruction signal from the secure communication circuit 31*f* of the master 31, the secure communication circuit 32*e* of the slave 32 notifies the power supply control circuit 32*d* accordingly (T20). Upon receiving, from the secure communication circuit 32*e*, a signal indicating the receipt of the boot instruction signal, the power supply control circuit 32*d* starts up the MCU 32*a* (T21). Although not illustrated in FIG. 9, the MCU 32*a* subsequently performs a boot process based on the boot code stored in the RAM 32*b*.

Note that, although not illustrated in FIG. 9, in the case of transmitting encrypted data from the slave 32 to a different slave, the secure communication circuit 32*e* of the slave 32 makes a location confirmation inquiry to the destination slave based on the route information. Subsequently, upon receiving a response to the location confirmation inquiry, the secure communication circuit 32*e* reads the boot code from the RAM 32*b* and encrypts the route information and the boot code, and then transmits the encrypted data to the destination slave.

Note that the processor 30 is able to deliver boot code of the application processors of the slaves 32 to 39 (e.g. the application processor 32*c* in the case of the slave 32) in a similar manner as described above.

Note that the encrypted data including boot code and route information may be transmitted from a single master or slave to a plurality of slaves.

Figure 10:
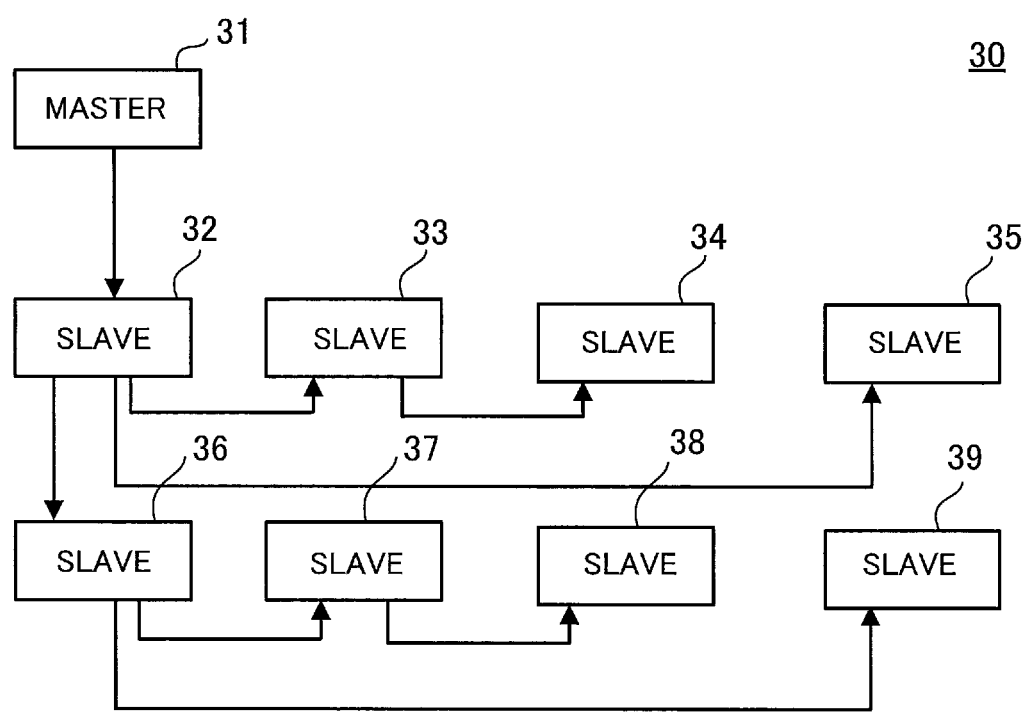
FIG. 10 illustrates an exemplary delivery route for encrypted data.

FIG. 10 illustrates an exemplary delivery route for encrypted data.

According to the delivery route for encrypted data illustrated in FIG. 10, the slave 32 having received encrypted data transmitted by the master 31 transmits the encrypted data to the slaves 33, 35, and 36. Then, the slave 36 transmits the encrypted data to the slaves 37 and 39. The slave 33 transmits the encrypted data to a single slave, i.e., the slave 34, and the slave 37 transmits the encrypted data to a single slave, i.e., the slave 38. Note that the delivery of the encrypted data to a plurality of slaves takes place in a predetermined order based on route information, and not simultaneously.

Route information indicating such a delivery route is represented as follows.

FIG. 11 illustrates exemplary route information.

In the route information, the second and subsequent items (Item Nos. 2 to 9) are associated with data representing information of the slaves 32 to 39, respectively, which is arranged according to subtree units of the tree-structured delivery route.

For example, because the delivery route of FIG. 10 includes a subtree designating the delivery of encrypted data in the order of the slaves 32, 36, 37, and 38, the information of the slaves 32, 36, 37, and 38 is arranged in the stated order. Further, the delivery route includes a subtree designating the delivery of encrypted data from the slave 36 to the slave 39, a subtree designating the delivery of encrypted data from the slave 32 to the slave 33 and then the slave 34, and a subtree designating the delivery of encrypted data from the slave to the slave 35. Therefore, the information of the 32 slaves 39, 33, 34, and 35 is arranged according to these subtree units.

FIG. 12 illustrates exemplary slave information.

In the example of FIG. 12, the following MAC addresses are assigned to the individual devices: MACM to the master 31; MACS0 to the slave 32; MACS1 to the slave 33; MACS2 to the slave 34; MACS3 to the slave 35; MACS4 to the slave 36; MACS5 to the slave 37; MACS6 to the slave 38; and MACS7 to the slave 39.

Also, FIG. 12 depicts an example where boot code with a data size of S1, stored, within the non-volatile memory device 42, in a memory area with a beginning address of Add0 is stored, within the RAM of each of the slaves 32 to 39, in a memory area with a beginning address of Add1.

To deliver encrypted data using such route information, the secure communication circuit 31*f* of the master 31 performs the following procedure.

The secure communication circuit 31*f* transmits, to a slave represented by the top slave information included in the route information, boot code and route information corresponding to a set of slave information, starting with the top slave information up to slave information immediately preceding next slave information with the MAC address of the master 31 set as the source MAC address. In the case where there is a plurality of pieces of slave information whose source MAC address is set to the MAC address of the master 31, a similar operation is repeatedly performed. Specifically, in the second round, the secure communication circuit 31*f* transmits, for example, boot code and route information corresponding to a set of slave information, starting with the second slave information whose source MAC address is set to the MAC address of the master 31 up to slave information immediately preceding the third slave information whose source MAC address is set to the MAC address of the master 31.

In the example of FIG. 12, the slave information of the slave 32 is the only slave information whose source MAC address is set to MACM, which is the MAC address of the master 31. Therefore, route information including the slave information of all the slaves 32 to 39 is transmitted to the slave 32.

The secure communication circuit of each of the slaves 32 to 39 (e.g. the secure communication circuit 32*e* in the case of the slave 32) disregards the first slave information included in the received route information because it is associated with its own slave, and instead regards the second slave information as the top slave information. Then, the secure communication circuit of each of the slaves 32 to 39 transmits, to a slave represented by the top slave information, boot code and route information corresponding to a set of slave information, starting with the top slave information up to slave information immediately preceding one with its own MAC address set as the source MAC address. In the case where there is a plurality of pieces of slave information whose source MAC address is set to its own MAC address, a similar operation is repeatedly performed.

Note that each of the slaves 32 to 39 ends the delivery process if the received route information includes only a single piece of slave information since there is no destination for the slave to transmit the route information. Also, if there is no slave information piece to be transmitted, each of the slaves 32 to 39 ends the delivery process.

In the example of FIG. 12, the slave 32 transmits, to the slave 36, boot code and route information corresponding to a set of slave information, starting with the slave information associated with the item No. 3 (i.e., the slave information of the slave 36) up to slave information immediately preceding the nearest slave information down the list, whose source MAC address is set to its own MAC address, i.e., the slave information associated with the item No. 7. The slave 32 also transmits, to the slave 33, boot code and route information corresponding to a set of slave information, starting with the slave information associated with the item No. 7 (i.e., the slave information of the slave 33) up to slave information immediately preceding the nearest slave information down the list, whose source MAC address is set to its own MAC address, i.e., the slave information associated with the item No. 9. Further, the slave 32 transmits, to the slave 35, the slave information associated with the item No. 9 (i.e., the slave information of the slave 35) as route information, together with boot code.

As described above, if there is a plurality of destinations, the master 31 and the slaves 32 to 39 individually create route information to be transmitted to each of the destinations by leaving out information on delivery routes (pieces of slave information) associated with the remaining destinations. This reduces the amount of information transmitted, which in turn cuts the time needed to deliver boot code.

Note that the master 31 and the slaves 32 to 39 may individually delete the top slave information from route information and then transmit the resultant route information to each destination slave.

(Method for Collecting Status Information)

The master 31 of the processor 30 according to the second embodiment described above may collect, from the slaves 32 to 39, status information indicating the status of each slave.

Figure 13:
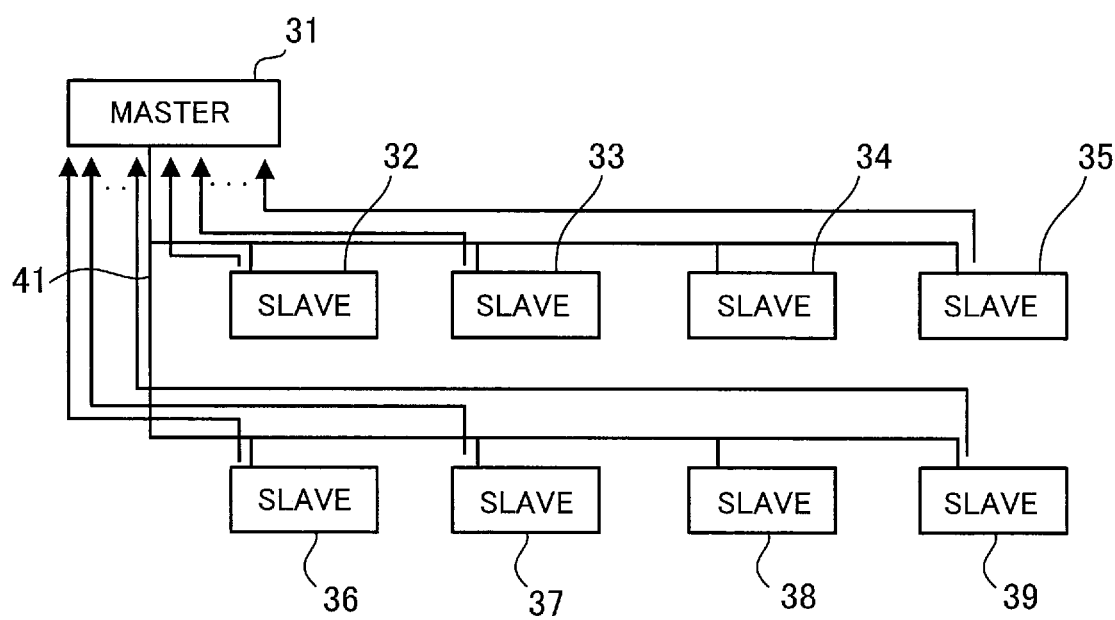
FIG. 13 illustrates an exemplary process of collecting status information.

FIG. 13 illustrates an exemplary process of collecting status information.

Status information of each of the slaves 32 to 39 in operation is transmitted from the secure communication circuit of the slave to the master 31 via the network 41. The transmission of the status information to the master 31 takes place periodically.

Figure 14:
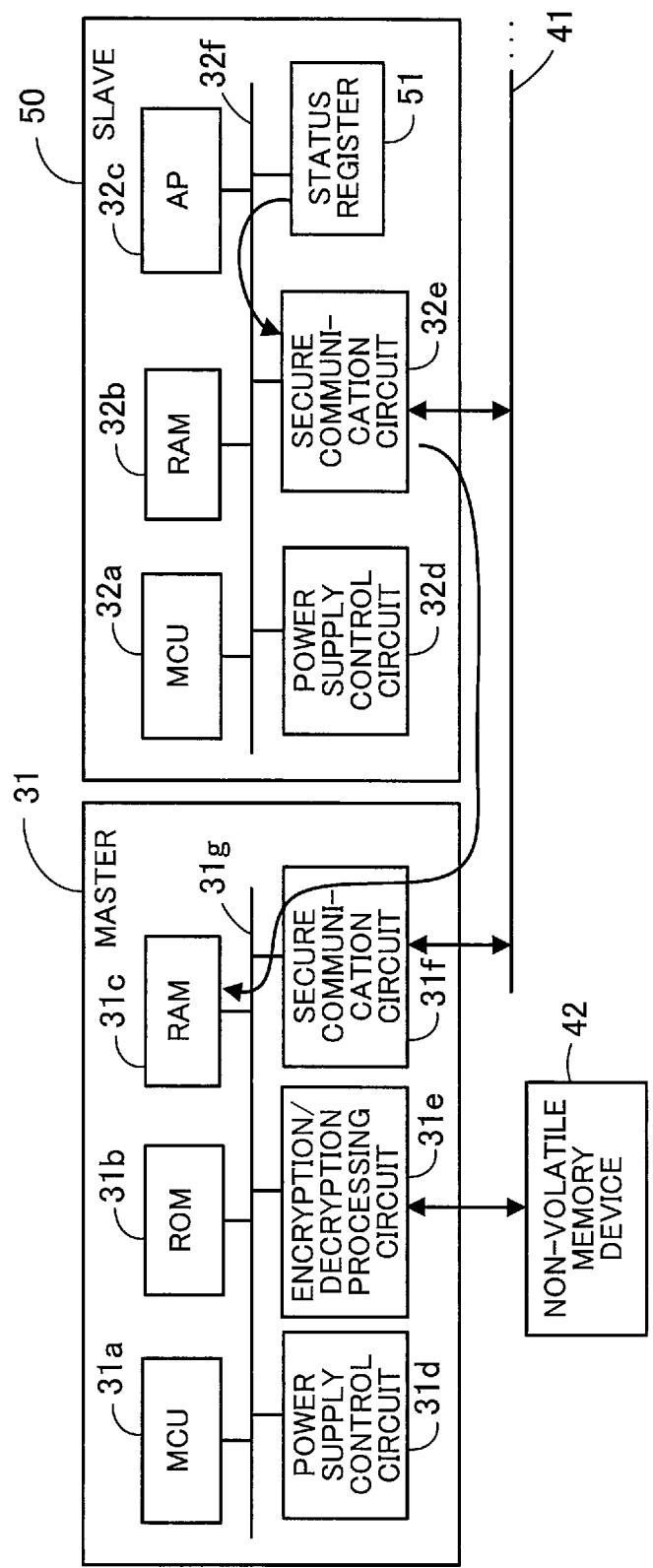
FIG. 14 illustrates the status information being transmitted from a slave to a master.

FIG. 14 illustrates status information being transmitted from a slave to a master.

A slave 50 is configured by adding, to the slave 32 of FIG. 6, a status register 51 for holding status information therein. For example, a flag bit indicating the operation status of the application processor 32c is written in the status register 51 as status information. The slave 50 may have a function of detecting an abnormality. In such a case, information indicating the presence or absence of an abnormality is written in the status register 51 as status information.

The secure communication circuit 32e has, for example, a timer, and periodically reads the status information stored in the status register 51. Then, the secure communication circuit 32e encrypts the read status information and transmits it to the master 31 via the network 41. Note that the secure communication circuit 32e may periodically read the status information stored in the status register 51, for example, under the control of the MCU 32a or the power supply control circuit 32d.

Upon receiving the encrypted status information, the secure communication circuit 31f of the master 31 performs a decryption process and stores decrypted status information in the RAM 31c. The MCU 31a of the master 31 refers to the status information stored in the RAM 31c to thereby determine whether an abnormality is present in the slave 50.

According to the processor 30 of the second embodiment described above, the master 31, serving as a starting point, delivers boot code of the slaves 32 to 39 to the slaves 32 to 39. This eliminates the need to provide each of the slaves 32 to 39 with a non-volatile memory device connected thereto for storing the boot code. In addition, the secure communication circuit of each of the slaves 32 to 39 (e.g. the secure communication circuit 32e in the case of the slave 32) decrypts encrypted boot code. This eliminates the need to provide each of the slaves 32 to 39 with a controller on a different chip connected thereto to handle the decryption process and the like. As a result, even if the number of slaves increases, it is possible to prevent a rise in the number of chips and non-volatile memory devices for storing boot code. This enhances the reliability of the processor 30 with a simple configuration, which in turn is likely to reduce the cost.

In addition, the slaves 32 to 39 individually encrypt again decrypted boot code and route information and then transmit the encrypted data to each destination based on the route information. This results in reduced workload of the master 31.

According to the processing apparatus including a plurality of semiconductor integrated circuits disclosed herein, it is possible to enhance its reliability with a simple configuration.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A processing apparatus comprising:
   a first semiconductor integrated circuit configured to generate a second boot code by encrypting a first boot code and transmit, based on first route information indicating a delivery route of the second boot code, first data including the second boot code to a first destination via a first network; and
   a second semiconductor integrated circuit configured to serve as the first destination and receive the first data via the first network, and generate the first boot code by decrypting the second boot code,
   wherein:
   the first boot code includes a fourth boot code to be used by the second semiconductor integrated circuit and a fifth boot code to be used by a third semiconductor integrated circuit; and the first semiconductor integrated circuit generates the second boot code by encrypting the fourth boot code and the fifth boot code.

2. The processing apparatus according to claim 1, wherein:
the second semiconductor integrated circuit performs a boot process based on the first boot code.

3. The processing apparatus according to claim 1, wherein:
the first semiconductor integrated circuit transmits a boot instruction signal to the first destination upon receiving, from the first destination, an acknowledgement signal indicating that receipt of the first data is completed; and
the second semiconductor integrated circuit transmits the acknowledgement signal to the first semiconductor integrated circuit upon receiving the first data, and performs a boot process based on the first boot code upon receiving the boot instruction signal.

4. The processing apparatus according to claim 1, wherein:
the first semiconductor integrated circuit generates second route information by encrypting the first route information and transmits, to the first destination, the first data which includes the second boot code and the second route information.

5. The processing apparatus according to claim 4, wherein:
the second semiconductor integrated circuit generates the first route information by decrypting the second route information.

6. The processing apparatus according to claim 1, wherein:
the second semiconductor integrated circuit identifies, based on the first route information, the third semiconductor integrated circuit which serves as a second destination, generates a third boot code by encrypting the fifth boot code, and transmits second data including the third boot code to the third semiconductor integrated circuit via the first network; and
the third semiconductor integrated circuit receives the second data via the first network, generates the fifth boot code by decrypting the third boot code, and performs a boot process based on the fifth boot code.

7. The processing apparatus according to claim 6, wherein:
the second semiconductor integrated circuit generates third route information by encrypting the first route information, and transmits, to the third semiconductor integrated circuit via the first network, the second data which includes the third boot code and the third route information.

8. The processing apparatus according to claim 6, wherein:
the second semiconductor integrated circuit generates third route information by encrypting information which is obtained by leaving out, from the first route information, information on the delivery route associated with the first destination and transmits, to the third semiconductor integrated circuit via the first network, the second data which includes the third boot code and the third route information.

9. The processing apparatus according to claim 1, wherein:
the second semiconductor integrated circuit generates third route information by encrypting the first route information, and transmits, to the third semiconductor integrated circuit via the first network, a second data which includes a third boot code generated by encrypting the fifth boot code and the third route information.

10. The processing apparatus according to claim 1, wherein:
the second semiconductor integrated circuit generates third route information by encrypting information which is obtained by leaving out, from the first route information, information on the delivery route associated with the first destination and transmits, to the third semiconductor integrated circuit via the first network, a second data which includes a third boot code generated by encrypting the fifth boot code and the third route information.

11. The processing apparatus according to claim 1, wherein:
when the first semiconductor integrated circuit transmits, to a plurality of destinations, the first data which includes the second boot code and second route information generated by encrypting the first route information, or when the second semiconductor integrated circuit transmits, to the plurality of destinations, second data which includes a third boot code generated by encrypting the fifth boot code and third route information generated by encrypting the first route information, information on the delivery route associated with the plurality of destinations except for one destination is left out from the second route information or the third route information to be transmitted to the one destination.

12. The processing apparatus according to claim 1, wherein:
the first network is provided independently of a second network connected to outside of the processing apparatus.

13. The processing apparatus according to claim 1, further comprising:
a memory unit configured to store an encrypted boot code, wherein the first semiconductor integrated circuit reads the encrypted boot code from the memory unit and generates the first boot code by decrypting the encrypted boot code.

14. The processing apparatus according to claim 1, wherein:
each of the first semiconductor integrated circuit and the second semiconductor integrated circuit includes:
a communication circuit configured to encrypt data and transmit the encrypted data to a destination via the first network; and
a control circuit configured to be connected to the communication circuit via a system bus and control each element of a corresponding one of the first semiconductor integrated circuit and the second semiconductor integrated circuit; and
the communication circuit of the second semiconductor integrated circuit starts up while the control circuit of the second semiconductor integrated circuit is yet to be started, receives the first data via the first network, and generates the first boot code by decrypting the second boot code.

15. The processing apparatus according to claim 14, wherein:
each of the first semiconductor integrated circuit and the second semiconductor integrated circuit further includes a power supply control circuit configured to be connected, via the system bus, to the communication circuit of the corresponding semiconductor integrated circuit and determine whether to start up each element thereof; and when the processing apparatus is powered on, the control circuit and the communication circuit of the first semiconductor integrated circuit start up under control of the power supply control circuit of the first semiconductor integrated circuit, and the communication circuit of the second semiconductor integrated circuit starts up while the control circuit thereof is yet to be started under control of the power supply control circuit of the second semiconductor integrated circuit.

16. The processing apparatus according to claim 14, wherein:

the second semiconductor integrated circuit encrypts status information and transmits the encrypted status information from the communication circuit thereof to the first semiconductor integrated circuit via the first network; and the first semiconductor integrated circuit receives the encrypted status information via the first network and decrypts the encrypted status information.

17. A semiconductor integrated circuit comprising:

a communication circuit configured to generate a second boot code by encrypting a first boot code and transmit, based on first route information indicating a delivery route of the second boot code, first data including the second boot code to a first semiconductor integrated circuit via a first network, and receive, from the first semiconductor integrated circuit, an acknowledgement signal indicating that receipt of the first data is completed; and a control circuit configured to be connected to the communication circuit via a system bus, and cause, when the communication circuit receives the acknowledgement signal, the communication circuit to transmit, to the first semiconductor integrated circuit via the first network, a boot instruction signal instructing the first semiconductor integrated circuit to perform a boot process based on the first boot code, wherein:

the first boot code includes a third boot code to be used by the first semiconductor integrated circuit and a fourth boot code to be used by a second semiconductor integrated circuit; and the communication circuit generates the second boot code by encrypting the third boot code and the fourth boot code.

18. The semiconductor integrated circuit according to claim 17, further comprising:

a decryption processing circuit configured to be connected to the communication circuit via the system bus, read an encrypted boot code from a memory unit, and generate the first boot code by decrypting the encrypted boot code.

19. The semiconductor integrated circuit according to claim 17, wherein:

the communication circuit generates second route information by encrypting the first route information, and generates the first data which includes the second boot code and the second route information.

20. The semiconductor integrated circuit according to claim 17, further comprising:

a power supply control circuit configured to be connected to the communication circuit via the system bus and determine whether to start up each element of the semiconductor integrated circuit, wherein:

the communication circuit starts up under control of the power supply control circuit and generates the second boot code; and the control circuit starts up under control of the power supply control circuit and causes the communication circuit to transmit the boot instruction signal to the first semiconductor integrated circuit via the first network.

21. A semiconductor integrated circuit comprising:

a communication circuit configured to receive, via a first network, first data including an encrypted first boot code which includes an encrypted fourth boot code to be used by the semiconductor integrated circuit and an encrypted fifth boot code to be used by a first semiconductor integrated circuit, transmit, to a source of the first data, an acknowledgement signal indicating that receipt of the first data is completed, and generate a second boot code by decrypting the encrypted first boot code;

a memory circuit configured to be connected to the communication circuit via a system bus and store the second boot code therein;

a control circuit configured to be connected to the communication circuit via the system bus and perform a boot process based on the second boot code; and a power supply control circuit configured to be connected to the communication circuit via the system bus and determine whether to start up the communication circuit and the control circuit.

22. The semiconductor integrated circuit according to claim 21, wherein:

the communication circuit starts up, under control of the power supply control circuit, while the control circuit is yet to be started, and receives a boot instruction signal from the source; and the power supply control circuit starts up the control circuit when the communication circuit receives the boot instruction signal.

23. The semiconductor integrated circuit according to claim 21, wherein:

the communication circuit identifies, based on first route information indicating a delivery route of the encrypted first boot code, the first semiconductor integrated circuit to be a destination, generates a third boot code by encrypting the fifth boot code, and transmits second data including the third boot code to the first semiconductor integrated circuit via the first network.

24. The semiconductor integrated circuit according to claim 23, wherein:

the communication circuit generates third route information based on information obtained by leaving out information on the delivery route associated with the semiconductor integrated circuit from the first route information, and transmits, to the first semiconductor integrated circuit via the first network, the second data which includes the third boot code and the third route information.

25. The semiconductor integrated circuit according to claim 23, wherein:

the communication circuit receives the first route information being encrypted from the source of the first data and generates second route information by decrypting the first route information.

26. A semiconductor integrated circuit boot method comprising:

generating, by a first semiconductor integrated circuit, a second boot code by encrypting a first boot code;

transmitting, by the first semiconductor integrated circuit, first data including the second boot code to a first destination via a first network, based on first route information indicating a delivery route of the second boot code;

receiving, by a second semiconductor integrated circuit which is the first destination, the first data via the first network and generating the first boot code by decrypting the second boot code; and performing, by the second semiconductor integrated circuit, a boot process based on the first boot code, wherein:

the first boot code includes a fourth boot code to be used by the second semiconductor integrated circuit and a fifth boot code to be used by a third semiconductor integrated circuit; and the second boot code is generated by encrypting the fourth boot code and the fifth boot code.

* * * * *